United States Patent [19]

Shimizu et al.

[11] Patent Number: 5,049,613

[45] Date of Patent: Sep. 17, 1991

[54] THERMOPLASTIC RESIN COMPOSITION

[75] Inventors: Sachio Shimizu, Chiba; Tetsuji Miura, Tokyo; Toshio Noda, Ichihara; Hiroshi Murakami, Isesaki, all of Japan

[73] Assignee: Denki Kagaku Kogyo Kabushiki Kaisha, Tokyo, Japan

[21] Appl. No.: 310,903

[22] Filed: Feb. 16, 1989

[30] Foreign Application Priority Data

Feb. 24, 1988 [JP] Japan .................................. 63-41015
Nov. 11, 1988 [JP] Japan ................................ 63-283720

[51] Int. Cl.$^5$ ............................................. C08L 77/00
[52] U.S. Cl. ........................................ 525/66; 525/179
[58] Field of Search ................................ 525/179, 66

[56] References Cited

U.S. PATENT DOCUMENTS

| | | | |
|---|---|---|---|
| 4,174,358 | 11/1979 | Epstein .................................. | 525/183 |
| 4,528,326 | 7/1985 | Dean et al. ............................ | 525/66 |
| 4,543,392 | 9/1985 | Kasahara et al. ..................... | 525/90 |
| 4,740,552 | 4/1988 | Grant et al. .......................... | 525/66 |

FOREIGN PATENT DOCUMENTS

| | | |
|---|---|---|
| 0046040 | 7/1981 | European Pat. Off. . |
| 57-57719 | 4/1982 | Japan . |
| 58-71952 | 4/1983 | Japan .................................. 525/179 |
| 61-171751 | 8/1986 | Japan . |
| 62-22844 | 1/1987 | Japan . |
| 62-59647 | 3/1987 | Japan . |
| 62-161853 | 4/1987 | Japan . |
| 62-179546 | 8/1987 | Japan . |
| 62-185725 | 8/1987 | Japan . |
| 63-017949 | 1/1988 | Japan . |
| 63-105051 | 5/1988 | Japan . |
| 63-193947 | 8/1988 | Japan . |
| 63-193955 | 8/1988 | Japan . |

OTHER PUBLICATIONS

Patent Abstracts of Japan, vol. 12, No. 5 (C-467) [2852], Jan. 8, 1988; & JP-A-62 161 853 (Denki Kagaku Kogyo K.K.) 17-07-1987.

Chemical Abstracts, vol. 108, Feb. 22, 1988, p. 37, Abstract No. 57163h, Columbus, Ohio, U.S.; & JP-A-62 179 546 (Japan Synthetic Rubber Co., Ltd) 06-08-1987.

Primary Examiner—Ana L. Carrillo
Attorney, Agent, or Firm—Oblon, Spivak, McClelland, Maier & Neustadt

[57] ABSTRACT

A thermoplastic resin composition comprising:
(A) from 10 to 50% by weight of a maleimide copolymer of from 30 to 70 mol % of an aromatic vinyl monomer, from 30 to 50 mol % of a maleimide monomer, from 3 to 20 mol % of an unsaturated dicarboxylic anhydride monomer and from 0 to 50 mol % of other copolymerizable monomer;
(B) from 40 to 80% by weight of a polyamide; and
(C) from 3 to 40% by weight of a polyolefin polymer modified by from 0.1 to 10% by weight of an unsaturated dicarboxylic anhydride monomer and/or an unsaturated carboxylic acid monomer,
wherein said maleimide copolymer is in the form of dispersed particles of from 0.01 to 1.0 μm.

8 Claims, 2 Drawing Sheets

THERMOPLASTIC RESIN COMPOSITION

The present invention relates to a thermoplastic resin composition having good mechanical properties and moldability and capable of providing a molded product having excellent appearance. More particularly, it relates to a thermoplastic resin composition comprising a polyamide and a specific maleimide copolymer and having the moisture absorptivity, heat resistance and moldability of a polyamide improved and yet capable of providing a molded product having excellent outer appearance.

Polyamides are excellent in such properties as the mechanical properties, chemical resistance, abrasion resistance and electrical properties. On the other hand, they have drawbacks that they are poor in the impact resistance and heat resistance, and they have a large molding shrinkage, whereby the molded products tend to be defective with sink marks or warpage. Further, they have high moisture absorptivity, whereby not only the molded products tend to have a defective appearance during the molding operation, but also there will be a substantial change in the dimension or the shape of the molded products. Further, it is known that the mechanical properties of the molded products are likely to change. Further, the viscosity of the molten resin is low, and a drooling phenomenon is likely to occur whereby the molten resin flows out of the nozzle of a molding machine during the injection molding. Thus, they have a drawback that the molding operation tends to be cumbersome.

For the purpose of overcoming such drawbacks of polyamides, it has been attempted to mix or react various polymer materials to polyamides. For example, it was proposed to melt-mix a styrene resin such as polystyrene or a styrene-acrylonitrile copolymer (Japanese Examined Patent Publications No. 23476/1963 and No. 7380/1965, U.S. Pat. Nos. 3,243,478 and 3,243,479, and Laid-open German Patent Application No. 2,403,889). However, such a resin was poor in the compatibility with polyamides, and an interlaminar peeling phenomenon used to be observed with a molded product made of the composition thereby obtained, and the composition was also poor in the mechanical properties. Further, it was proposed to mix a copolymer of styrene with an unsaturated dicarboxylic anhydride monomer to a polyamide (Japanese Unexamined Patent Publication No. 50931/1981) However, the composition thereby obtained was poor in the heat stability. A three component composition was known wherein a copolymer of styrene with an unsaturated dicarboxylic acid anhydride monomer was used as a compatibilizing agent for a styrene resin and a polyamide for the purpose of improving the compatibility (Japanese Unexamined Patent Publication No. 195157/1985). Although the compatibility and the heat stability were improved with the composition, but the effects were still inadequate. A copolymer was known which was produced by melt-mixing a polyamide with a copolymer containing an imide compound of an unsaturated dicarboxylic acid so that the two polymer chains were bonded to each other (Japanese Unexamined Patent Publications No. 57719/1982 and No. 141426/1982). However, the properties of the resulting copolymer were very much affected by the production conditions by the melt-mixing machine, and such was industrially disadvantageous. Further, the heat resistance and impact resistance of the resulting copolymer were not necessarily adequate. A composition comprising an unsaturated dicarboxylic acid anhydride, an aromatic vinyl copolymer, a polyamide and a modified polyolefin, was also known (Japanese Unexamined Patent Publication No. 171751/1986). However, such a composition was inadequate with respect to the heat resistance and the thermal stability. As an improvement of this composition, a three-component composition comprising a copolymer of a maleimide monomer, a polyamide and a modified polyolefin (Japanese Unexamined Patent Publications No. 59647/1987 and No. 179546/1987) was proposed. However, a molded product prepared from this composition showed a defect on the surface near the gate and had an interlaminar peeling tendency, and it was inadequate in the balance of the impact resistance, elongation and rigidity.

As described in the foregoing, a number of attempts have been made to improve various properties of polyamides. However, the effects have been practically inadequate in all cases.

Under these circumstances, it is an object of the present invention to provide a polyamide resin composition having good heat resistance and impact resistance and a good balance of the elongation, rigidity, etc. and yet being capable of providing a molded product having excellent appearance.

The present invention provides a thermoplastic resin composition comprising:

(A) from 10 to 50% by weight of a maleimide copolymer of from 30 to 70 mol% of an aromatic vinyl monomer, from 30 to 50 mol% of a maleimide monomer, from 3 to 20 mol% of an unsaturated dicarboxylic anhydride monomer and from 0 to 50 mol% of other copolymerizable monomer;

(B) from 40 to 80% by weight of a polyamide; and (C) from 3 to 40% by weight of a polyolefin polymer modified by from 0.1 to 10% by weight of an unsaturated dicarboxylic anhydride monomer and/or an unsaturated carboxylic acid monomer, wherein said maleimide copolymer is in the form of dispersed particles of from 0.01 to 1.0 μm.

The above composition has an excellent balance of the impact resistance, elongation, rigidity, heat resistance, etc., and it is excellent in the moldability, has a low moisture absorptivity, and yet is capable of providing a molded product having excellent appearance.

Further, in the present invention, it is preferred that the modified polyolefin polymer is also in the form of dispersed particles having a non-specific shape having a size of not larger than a few μm and is substantially uniformly dispersed.

Now, the present invention will be described in detail with reference to the preferred embodiments.

There is no particular restriction as to a method for producing the maleimide copolymer to be used in the present invention. For example, it may be produced by radical copolymerization of the aromatic vinyl monomer, the maleimide monomer, the unsaturated dicarboxylic anhydride monomer and other copolymerizable monomer which is preferably an acrylate monomer.

Specific examples of the aromatic vinyl monomer include styrene, α-methylstyrene, vinyl toluene and t-butylstyrene. Specific examples of the maleimide monomer include maleimide, N-methylmaleimide, N-ethylmaleimide, N-propylmaleimide, N-hexylmaleimide, N-cyclohexylmaleimide, N-phenylmaleimide and N-tolylmaleimide. Specific examples of the unsaturated dicarboxylic anhydride monomer include maleic anhydride, methylmaleic anhydride, 1,2-dimethylmaleic anhydride, ethylmaleic anhydride and phenylmaleic anhydride. Specific examples of the acrylate monomer include methyl (meth)acrylate, ethyl (meth)acrylate, butyl (meth)acrylate, hexyl (meth)acrylate, cyclohexyl (meth)acrylate, decyl (meth)acrylate, octadecyl (meth)acrylate, hydroxyethyl (meth)acrylate, methoxyethyl (meth)acrylate and glycidyl (meth)acrylate. These materials may be used alone or in combination. In this specification, (meth)acrylate is meant for acrylate and methacrylate. Thus, methyl (meth)acrylate is meant for methyl acrylate and methyl methacrylate.

There is no particular restriction as to the method for copolymerizing these monomers, and any conventional radical copolymerization method may be employed.

As another method for producing the maleimide copolymer to be used in the present invention, a method may be mentioned wherein a copolymer of an aromatic vinyl monomer, an unsaturated dicarboxylic anhydride monomer and an acrylate monomer, is reacted with ammonia or with a primary amine to convert the acid anhydride group to an imido. The imido-conversion reaction of a polymer material having an acid anhydride group in the polymer chain, with an amine compound, is known. For example, a polymer material and an amine compound are reacted in accordance with a method disclosed in Japanese Examined Patent Publication No. 26936/1986 or No. 8456/1987, to obtain a desired maleimide copolymer having an imido group.

Specific examples of the primary amine useful for the imido-conversion reaction include methylamine, ethylamine, propylamine, butylamine, hexylamine, cyclohexylamine, decylamine, aniline, toluidine, naphthylamine, chlorophenylamine, dichlorophenylamine, bromophenylamine and dibromophenylamine.

The imido-conversion reaction may be conducted in a solution state, in a bulk molten state or in a suspension state by using an autoclave. Further, the reaction may be conducted in a molten state by using a melt kneading apparatus such as a screw extruder.

Any suitable solvent may be employed in the solution reaction. For example, the solvent may be a ketone such as acetone, methyl ethyl ketone, methyl isobutyl ketone or cyclohexanone, an ether such as tetrahydrofuran or 1,4-dioxane, an aromatic hydrocarbon such as toluene or xylene, dimethylformamide, dimethylsulfoxide or n-methyl-2-pyrrolidone.

The reaction temperature for imido-conversion is preferably within a range of from 50° to 350° C., more preferably within a range of from 100° to 300° C.

The presence of a catalyst is not necessarily required for the imido-conversion reaction. However, if a catalyst is to be used, a tertiary amine such as trimethylamine, triethylamine, tributylamine, N,N-dimethylaniline or N,N-diethylaniline is preferred.

The maleimide copolymer to be used in the present invention comprises from 30 to 70 mol% of an aromatic vinyl monomer group, from 30 to 50 mol% of a maleimide monomer group, from 3 to 20 mol% of an unsaturated dicarboxylic anhydride monomer group and from 0 to 50 mol% of an acrylate monomer group. Preferably, it comprises from 50 to 60 mol% of an aromatic vinyl monomer group, from 40 to 50 mol% of a maleimide monomer group, from 3 to 10 mol% of an unsaturated dicarboxylic anhydride monomer group and from 0 to 30 mol% of an acrylate monomer group. If the aromatic vinyl monomer group is less than 30 mol%, it tends to be difficult to produce a polymer having a uniform composition on an industrial scale with good reproducibility, and a composition obtainable by mixing such a maleimide copolymer to an polyamide tends to be poor in such properties as the heat stability, moldability and mechanical strength. If the aromatic vinyl monomer group exceeds 70 mol%, or if the maleimide monomer group is less than 30 mol%, the resulting composition tends to be poor in the heat resistance. If the maleimide monomer group exceeds 50 mol%, the resulting composition tends to be poor in the moldability. If the unsaturated dicarboxylic anhydride monomer group is less than 3 mol%, a composition obtained by mixing such a maleimide copolymer with the polyamide tends to be poor in the compatibility, and the dispersed particles of the maleimide copolymer tend to have a large particle size, whereby the mechanical strength tends to be poor, and a molded product of such a composition tends to show an interlaminar peeling phenomenon. If the unsaturated dicarboxylic anhydride monomer group exceeds 20 mol%, the particle size of the dispersed particles of the maleimide copolymer in the composition tends to be too small, whereby the moldability tends to be poor, and the heat stability of the molded product tends to be poor, and the surface is likely to be roughened showing a shark skin.

There is no particular restriction as to the polyamide to be used in the present invention. It may be a polyamide obtained from an aliphatic, aromatic or alicyclic dicarboxylic acid with a diamine, or a polyamide obtained from an aminocarboxylic acid or a cyclic lactam. Specific examples include alicyclic polyamides such as 6-nylon, 6,6-nylon, 6,9-nylon, 6,10-nylon, 6,12-nylon, 4,6-nylon, 11-nylon and 12-nylon, and polyamides having aromatic rings, such as poly(hexamethylene terephthalamide), poly(hexamethylene isophthalamide) and poly(m-xylyleneadipamide). These polyamides may be used alone or in combination.

The composition of the present invention is prepared by mixing from 10 to 50% by weight of the maleimide copolymer, from 40 to 80% by weight of the polyamide and from 3 to 40% by weight of the modified polyolefin polymer. If the maleimide copolymer is less than 10% by weight, or if the polyamide exceeds 80% by weight, the resulting composition tends to be inadequate in the degree of improvement in the heat resistance, in the moldability or in the moisture resistance. If the maleimide copolymer exceeds 50% by weight, or if the polyamide is less than 40% by weight, the resulting composition tends to be poor in the mechanical strength, in the chemical resistance or in the abrasion resistance.

If the modified polyolefin polymer is less than 3% by weight, the degree of improvement in the impact resistance tends to be low, and if it exceeds 40% by weight, the rigidity tends to substantially decrease.

The modified polyolefin polymer to be used in the present invention is a polyolefin polymer modified by an unsaturated dicarboxylic anhydride monomer and/or an unsaturated carboxylic acid monomer and preferably has a rubber elasticity.

The modified polyolefin polymer is meant for a modified product of a polymer or copolymer of an olefin monomer. Specific examples of such an olefin monomer includes ethylene, propylene, 1-butene, isobutylene, 2-butene, cyclobutene, 3-methyl-1-butene, 4-methyl-1-butene, 4-methyl-1-pentene, cyclopentene, 1-hexene, cyclohexene, 1-octene, 1-decene and 1-dodecene. Further, the modified polyolefin polymer may, as the case requires, be copolymerized with a non-conjugated diene monomer such as 4-ethylidenenorbornane or dicyclopentadiene, or with an acrylate monomer as mentioned above, as a copolymerizable monomer useful for the preparation of the maleimide copolymer, within a range where rubber elasticity is maintained, A preferred composition in this respect may, for example, comprise from 20 to 90 mol% of ethylene, from 10 to 80 mol% of an α-olefin monomer and from 0 to 10 mol% of other monomer. The ethylene content is more preferably from 50 to 85 mol%. Further, Tg of such a modified polyolefin polymer is preferably at most $-10°$ C., more preferably at most $-30°$ C. As the unsaturated dicarboxylic anhydride monomer constituting the modified polyolefin polymer, those mentioned above as the monomer useful for the maleimide copolymer, may be employed. Among them, maleic anhydride is particularly preferred. The unsaturated carboxylic acid monomer may be acrylic acid or methacrylic acid.

The content of the unsaturated dicarboxylic anhydride monomer group or the unsaturated carboxylic acid group in the modified polyolefin polymer is preferably from 0.1 to 10% by weight, more preferably from 0.1 to 5% by weight. If the amount is less than 0.1% by weight, the mechanical strength of the resulting composition tends to be inadequate, and an interlaminar peeling phenomenon is like to be observed in the molded product. If the content exceeds 10% by weight, the mechanical strength or the thermal stability is likely to be impaired.

The term "modified" in the present invention means that a monomer group used for modification, such as a maleic anhydride group, is present in the main chain or in the side chain of the polyolefin polymer. The modification can be conducted by a conventional technique such as random copolymerization or graft copolymerization. There is no particular restriction as to the manner for the modification. For example, the modification can be conducted in accordance with the methods disclosed in e.g. Japanese Examined Patent Publications No. 6810/1964, No. 43677/1977, No. 5716/1978, No. 9925/1981 and No. 445/1983. The graft product modified by the introduction of such a monomer group to the main chain is preferred from the viewpoint of low temperature impact resistance, etc. Further, the amount of the remaining unreacted monomer should preferably be small at a level of not more than 0.5% by weight. There is no particular restriction as to the molecular weight of the modified polyolefin polymer. However, the molecular weight is preferably from 50,000 to 500,000, more preferably from 100,000 to 300,000, in view of the balance of the impact resistance and the moldability.

Tafuma MP-0620 (manufactured by Mitsui Petrochemical) may be mentioned as a commercial product of such a modified polyolefin polymer.

In the composition of the present invention, the maleimide copolymer is in the form of dispersed particles, and the particle size of such dispersed particles is from 0.01 to 1.0 μm. A particularly preferred particle size is from 0.04 to 0.5 μm. More preferably, the particle size is from 0.05 to 0.3 μm. The particle size of such dispersed particles is a value measured by the transmission type electron microscopic observation of a super thin specimen cut out from a sample obtained by the treatment with hydrazine monohydrate, followed by dyeing with osmic acid. If the particle size of dispersed particles is less than 0.01 μm, the composition obtained by mixing them with the polyamide tends to have a high melt viscosity, whereby a defective phenomenon such as shark skin tends to appear on the surface of the molded product. If the size of dispersed particles exceeds 1.0 μm, the mechanical strength of the composition tends to be low.

It is preferred that the modified polyolefin polymer is also in the form of dispersed particles which are independent and have a non-specific shape, and it is substantially uniformly dispersed.

The present inventors have found that when the same polyamide is used in the same amount, particularly important as a factor for determining the size of dispersed particles in the composition, is the content of the unsaturated dicarboxylic anhydride monomer group in the maleimide copolymer. When the content is low, the particle size is large, and when the content is high, the particle size is small. Further, the content of the organic acid group in the modified polyolefin polymer, is likewise important, and it exhibits the same effects as the unsaturated dicarboxylic anhydride monomer group in the maleimide copolymer.

The composition of the present invention preferably contains a metal salt of an organic acid and/or an fatty acid amide compound. When these compounds are incorporated, the impact strength of the composition is improved.

The metal salt of an organic acid used in the present invention is a salt of a fatty acid such as lauric acid, myristic acid, palmitic acid, stearic acid, behenic acid, oleic acid, linolic acid, ricinolic acid or hydroxystearic acid, or an aromatic carboxylic acid such as phthalic acid, with a metal such as sodium, potassium, lithium, magnesium, calcium, strontium, barium, zinc, cadmium, aluminum, tin or lead. A bivalent metal salt such as magnesium, calcium, barium or zinc is preferred.

The fatty acid amide is a primary amide or a secondary amide of the above fatty acid. The secondary amide may be a bisamide such as methylenebisstearyl amide or ethylenebisstearyl amide.

The content of the metal salt of an organic acid and/or the aliphatic acid amide in the composition of the present invention is usually within a range of from 0.01 to 5% by weight, preferably from 0.05 to 2% by weight, more preferably from 0.2 to 1% by weight. If the content is less than 0.001% by weight, no adequate effect of the addition will be obtained. If the amount exceeds 5% by weight, the properties such as the heat resistance and rigidity, tend to deteriorate, and the degree of improvement in the impact resistance is likely to be small.

Particularly preferred is a combined use of such a metal salt of an organic acid and the fatty acid amide. With respect to the amounts of the metal salt of an organic acid and the fatty acid amide, the proportions are not critical so long as the amounts are within the above-mentioned range, but the proportions are preferably about 1 : 1.

Further, the composition of the present invention may contain an antioxidant. It is preferred to use a phenol type antioxidant with a view to preventing discoloration. The phenol type antioxidant includes octadecyl-3-(3,5 di-t-butyl-4-hydroxyphenyl)propionate (such as Irganox 1076), N,N-hexamethylenebis(3,5-di-t-butyl-4-hydroxycinnamamide (such as Irganox 1098), 3,5-di-t-butyl-4-hydroxytoluene, 2,2'-methylenebis(4-methyl-6-t-butylphenol), 4,4'-methylenebis(2,6-di-t-butylphenol), 4,4'-butylidene-bis-6-t-butyl-m-cresol, 2,6-bis-(2'-hydroxyl-3'-t-butyl-5'-methylbenzyl)-4 -methylphenol, 1,1,3-tris(2'-methyl-5'-t-butyl-4'-hydroxyphenyl)butane, 1,3,5-trimethyl-2,4,6-tris(3',5'-di-t-butyl-4'-hydroxybenzyl)benzene, 4,4'-thiobis(2'-methyl-6'-t-butylphenol), 2,2'-thiobis(4'-methyl-6'-t-butylphenol), 4,4'-thiobis(3-methyl-6-t-butylphenol), 1,1,1,1-tetrakis[methyl-3-(3,5-di-t-butyl-4-hydroxyphe phenyl)propionate]methane, 2,2'-thiodiethyl-bis[3-(3,5-di-t-butyl-4-hydroxyphenyl)-propionate],N-lauroyl-p-aminophenyl and N-stearoyl-p-aminophenol. It is preferred to use antioxidants for nylon and for olefin in combination. Further, it is of course possible to use a copper chelate type antioxidant for nylon.

As other factors, the size of dispersed particles is dependent also on the method of mixing the maleimide copolymer with the polyamide and the modified polyolefin polymer.

The mixing of the maleimide copolymer with the polyamide and the modified polyolefin polymer can be conducted by using a usual melt kneading apparatus. Useful melt kneading apparatus include a screw extruder, a Banbury mixer, a cokneader and a mixing roll.

To the composition of the present invention, other additives or modifiers may be added depending upon the particular use. Specifically, reinforcing fibers such as glass fibers, carbon fibers or aramide fibers, fillers such as talc, silica, clay, mica or calcium carbonate, ultraviolet absorbers, flame retardants, lubricants and colorants, may be mentioned.

The resin composition of the present invention may be formed into a molded product by a usual plastic molding machine. The molded products include, for example, automobile parts such as a meter hood, a defroster garnish, a resistor bezel, a cluster, an instrument panel, a speaker grill and a fitting ceiling, household electric appliances, office equipments, parts of other industrial products such as casings, radiator covers, switches, buttons, handles, arms, air discharge outlets, air inlets, reel tables, reel shafts and bobbins. Further, it is useful for applications where heat resistance and impact resistance are desired.

Now, the present invention will be described in further detail with reference to Examples. However, it should be understood that the present invention is by no means restricted by such specific Examples. In the Examples and Comparative Examples, "parts" and "%" mean "parts by weight" and "% by weight", respectively.

Various properties were measured by the following methods.

Size of dispersed particles in the composition: A preliminarily trimmed sample was immersed in hydrazine monohydrate and left to stand at 60° C. for 48 hours. After washing with water, this sample was immersed in a 1% osmic acid aqueous solution and left to stand at room temperature for 24 hours for dyeing. A super thin specimen was cut out from the dyed sample, and a photograph was taken by a transmission type electron microscope. The image thus obtained was analyzed to obtain the particle size.

Heat resistance: In accordance with ASTM D-648, the heat distortion temperature (HDT) was measured under a load of 18.6 kg/cm$^2$ by using a test piece having a thickness of ¼". (No annealing)

Impact strength: In accordance with ASTM D-256, a notched Izod was measured by using a test piece having a thickness of ¼". The ambient temperature was 23° C.

Flowability: In accordance with ASTM D-1238, the melt flow rate was measured under a load of 10 kg at a temperature of 265° C.

Appearance: A molded product having a boss and a rib on the rear side and an opening, was molded by a 5 ounce injection molding machine, and the appearance of the molded product was visually obsersed and evaluated. The molding temperature was 260° C.

(1) Polyamide (B)

The following 6-nylon, 12-nylon and 6,6-nylon obtained by melt polymerization were used.

b-1) 6-nylon: 6-nylon having a concentrated sulfuric acid relative viscosity of 2.65 obtained from ε-caprolactam.

b-2) 12-nylon: 12-nylon having a concentrated sulfuric acid relative viscosity of 2.40 obtained from 12-aminododecanoic acid.

b-3) 6,6-nylon: 6,6-nylon having a concentrated sulfuric acid relative viscosity of 2.55 obtained from an equimolar salt of hexamethylenediamine and adipic acid.

(2) Maleimide copolymer (A)

For a maleimide copolymer, 100 parts of styrene was charged into an autoclave equipped with a stirrer, and after flushing the system with nitrogen gas, the autoclave was heated to 80° C. Then, a solution obtained by dissolving 67 parts of maleic anhydride and 0.2 part of benzoin peroxide in 300 parts of methyl ethyl ketone, was dropwise added over a period of 8 hours. After the addition, the temperature was maintained at 80° C. for further 4 hours.

To the above copolymer, 12 parts of triethylamine and 38.1 parts of aniline were added, and the reaction was conducted at 130° C. for 7 hours. The reaction solution was cooled to room temperature and poured into 300 parts of methanol under vigorous stirring. The product was collected by filtration and dried to obtain a maleimide copolymer (a-3). Other maleimide copolymers were prepared in the same manner. These copolymers are shown in Table 1.

TABLE 1

|  | Aromatic vinyl monomer | Maleimide monomer | Unsaturated dicarboxylic acid | Unit: Mol % Copolymerizable monomer |
|---|---|---|---|---|
| a-1 | ST 59.5 | PMI 37.0 | MAH 3.5 | — |
| a-2 | ST 59.5 | PMI 34.8 | MAH 5.7 | — |
| a-3 | ST 59.5 | PMI 33.2 | MAH 7.3 | — |
| a-4 | ST 59.5 | PMI 28.5 | MAH 12.5 | — |
| a-5 | ST 53.7 | PMI 40.3 | MAH 6.0 | — |
| a-6 | ST 48.3 | PMI 35.0 | MAH 5.5 | MMA 11.2 |
| a-7 | VT 60.3 | PMI 34.1 | MAH 5.6 | — |
| a-8 | ST 59.5 | TMI 35.0 | MAH 5.5 | — |
| a-9 | ST 59.5 | PMI 40.5 | — | — |
| a-10 | ST 59.5 | PMI 19.5 | MAH 21.0 | — |

ST: Styrene. PMI: N-Phenylmaleimide. MAH: Maleic anhydride
VT: Vinyl toluene. TMI: N-toluylmaleimide. MMA: Methyl methacrylate (3) Modified polyolefin polymer (C)

10 kg of ethylene-α-olefin copolymer pellets having an ethylene content of 80 mol%, 120 g of maleic anhydride powder and 10.0 g of 2,5-dimethyl-2,5-di(t-butylperoxy)hexane-3, were charged into a 20 l Henschel mixer under a nitrogen stream and stirred for 5 minutes to obtain a uniform blend, which was pelletized by a 40 mmΦ extruder (under a nitrogen stream, L/T-28, Dulmage model). The cylinder temperature was adjusted so that the temperature of the polymer was 240° C. to obtain a graft reaction product (c-3) (amount of maleic anhydride introduced into the copolymer: 0.9% by weight). Other modified polyolefin polymers were prepared in the same manner. These polymers are shown in Table 2.

TABLE 2

| Polyolefin copolymer base | Modified polyolefin copolymer Molecular weight | Maleic anhydride content (unit: wt %) |
|---|---|---|
| c-1 Ethylene-α-olefin copolymer | 100,000 | 0 |
| c-2 " | " | 0.5 |
| c-3 " | " | 0.9 |
| c-4 " | " | 2.5 |
| c-5 " | 70,000 | 0.8 |
| c-6 " | 150,000 | 0.9 |

EXAMPLES 1 to 18 and COMPARATIVE EXAMPLES 1 to 5

0.05% by weight of barium stearate was blended to 10 kg of the above 6-nylon (b-1) by a 20 l Henschel mixer, and the blend was extruded at 240° C. by a 40 mmΦ extruder to obtain pellets. 5.0 kg of the pellets were charged into a 20 l Henschel mixer, and 0.5% by weight of ethylenebisstearylamide was blended thereto. Then, 3.5 kg of the maleimide copolymer resin (a-2), 1.5 kg of the modified polyolefin polymer (c-3) and antioxidants (0.25% by weight of octadecyl-3-(3,5-di-t-butyl)-hydroxyphenylpropionate and 0.5% by weight of N,N'-hexamethylenebis(3,5-di-t-butyl)hydroxyl-hydrocinnamide) were charged and blended. The blend was extruded at 290° C. by a 40 mmΦ extruder equipped with CTM (manufactured by Kobe Steel, Ltd.) to obtain pellets. The size of dispersed particles of the maleimide copolymer in the obtained composition was 0.1 μm. Further, the dispersed state of the particles of the modified polyolefin polymer was also good. Test pieces for measuring physical properties were prepared from the pellets by an injection molding machine, and various physical properties were measured. The results are shown in Table 3.

In the same manner, the operations of Examples 2 to 15 and Comparative Examples 1 to 5 were conducted. In Comparative Examples 1 and 2, the content of maleic anhydride in the maleimide copolymer is outside the specified range. In Comparative Example 3, the content of maleic anhydride in the modified polyolefin polymer is outside the specified range. In Comparative Examples 4 and 5, the content of the modified polyolefin polymer is outside the specified range.

As the molding temperature, 270° C. was used as standard, and some adjustment was made depending upon the condition of the molded product.

The results of the Examples and Comparative Examples show the following:

From the comparison between Example 2 and Comparative Example 1, it is evident that if the unsaturated dicarboxylic anhydride monomer group is not contained in the maleimide copolymer, the degree of improvement in the impact resistance is small and the elongation is also low, such being not practical. Further, the dispersion of the maleimide copolymer in this case was also poor, and the size of dispersed particles was large.

If the amount of the unsaturated dicarboxylic anhydride is too much as in Comparative Example 2, the impact resistance does not improve, and a poor appearance and a deterioration in the moldability (flow) result.

From the comparison between Example 2 and Comparative Example 3, it is evident that the content of the dicarboxylic anhydride in the polyolefin polymer is important, and if it is not contained, the degree of improvement in the impact resistance is small, and the outer appearance tends to be poor.

In the foregoing, it is evident that only when both components contain (either grafting or copolymerization) proper amounts of the unsaturated carboxylic anhydride, the balance of physical properties will be satisfactory.

Further, it is evident from the Examples and Comparative Examples, the dispersed state of the maleimide copolymer is important to the physical properties, and no good results will be obtained if the particle size is either too large or too small.

Electron microscopic photographs of the resin compositions obtained in Example 2 and Comparative Examples 1 and 3 are shown in FIGS. 1, 2 and 3, respectively.

As shown in FIG. 1, the particle size of the maleimide copolymer in the resin composition of the present invention is 0.1 μm, and the modified polyolefin polymer is substantially uniformly dispersed as a semicontinuous phase.

In Comparative Example 1, the size of dispersed particles of the maleimide copolymer is large, and the dispersed particle size of the modified polyolefin polymer is also different from Example 1 and is poor.

In Comparative Example 3, the size of dispersed particles of the maleimide copolymer is small, and the dispersion of the modified polyolefin polymer is nonuniform.

TABLE 3

| Example No. | 1 | 2 | 3 | 4 | 5 | 6 | 7 | 8 | 9 |
|---|---|---|---|---|---|---|---|---|---|
| Mixture | b-1 50 | b-1 50 | b-1 54 | b-1 50 | b-1 50 | b-1 50 | b-1 50 | b-1 50 | b-1 50 |
| (% by weight) | a-2 35 | a-2 35 | a-2 36 | a-2 30 | a-1 35 | a-2 35 | a-3 35 | a-4 35 | a-5 35 |
| | c-2 15 | c-3 15 | c-3 10 | c-3 20 | c-3 15 | c-6 15 | c-3 15 | c-3 15 | c-3 15 |
| Izod impact strength (notched, kg.cm/cm) | 18 | 35 | 10 | 48 | 10 | 42 | 25 | 9 | 34 |
| Elongation (%) | 17 | 32 | 10 | 55 | 9 | 35 | 31 | 29 | 30 |
| HDT (°C.) 18.6 kg | 105 | 108 | 110 | 100 | 108 | 106 | 104 | 110 | 112 |
| MFR (g/10 min. °C.) | 12.7 | 13.0 | 15.5 | 10.7 | 44.0 | 16.0 | 7.2 | 2.5 | 16.6 |
| Appearance | ○ | ○ | ○ | ○ | ○ | ○ | ○ | ○ | ○ |
| Particle size (μm) | 0.10 | 0.10 | 0.10 | 0.09 | 0.50 | 0.10 | 0.09 | 0.07 | 0.09 |
| Flexural modulus (kg/cm$^2$) | 22,400 | 21,300 | 24,500 | 19,000 | 20,100 | 23,000 | 22,000 | 26,500 | 20,900 |
| Dispersion of modified olefin | ○ | ⊚ | — | — | — | — | — | — | — |

| Example No. | 10 | 11 | 12 | 13 | 14 | 15 | 16*[1] | 17*[2] | 18*[3] |
|---|---|---|---|---|---|---|---|---|---|
| Mixture | b-1 50 | b-1 50 | b-2 50 | b-3 50 | b-1 50 | b-1 50 | b-1 50 | b-1 50 | b-1 50 |
| (% by weight) | a-6 35 | a-7 35 | a-3 35 | a-2 35 | a-8 35 | a-2 35 | a-2 35 | a-2 35 | a-2 35 |

TABLE 3-continued

|  | c-3 15 | c-3 15 | c-3 15 | c-3 15 | c-3 15 | c-5 15 | c-2 15 | c-2 15 | c-2 15 |
|---|---|---|---|---|---|---|---|---|---|
| Izod impact strength (notched, kg.cm/cm) | 35 | 34 | 20 | 15 | 30 | 10 | 30 | 15 | 10 |
| Elongation (%) | 30 | 27 | >100 | 15 | 25 | 19 | 27 | 40 | 50 |
| HDT (°C.) 18.6 kg | 108 | 112 | 95 | 115 | 106 | 110 | 107 | 108 | 109 |
| MFR (g/10 min. °C.) | 10.1 | 12.5 | 17.5 | 1.5 | 11.5 | 12.4 | 9.5 | 3.5 | 1.5 |
| Appearance | ◯ | ◯ | ◯ | ◯ | ◯ | ◯ | ◯ | ◯ | ◯ |
| Particle size (μm) | 0.11 | 0.09 | 0.12 | 0.08 | 0.10 | 0.09 | 0.11 | 0.09 | 0.08 |
| Flexural modulus (kg/cm²) | 22,500 | 21,000 | 12,800 | 21,300 | 22,000 | 21,800 | 21,500 | 21,000 | 22,000 |
| Dispersion of modified olefin | — | — | — | — | — | — | — | — | — |

| Comparative Example No. | 1 | 2 | 3 | 4 | 5 |
|---|---|---|---|---|---|
| Mixture (% by weight) | b-1 50 | b-1 50 | b-1 50 | b-1 25 | b-1 70 |
|  | a-9 35 | a-10 35 | a-2 35 | a-2 25 | a-2 30 |
|  | c-3 15 | c-3 15 | c-1 15 | c-3 50 | c-3 0 |
| Izod impact strength (notched, kg.cm/cm) | 3.0 | 7.5 | 2.5 | >40 | 2.5 |
| Elongation (%) | <3 | 40 | <3 | 100 | 53 |
| HDT (°C.) 18.6 kg | 78 | 100 | 106 | <50 | 85 |
| MFR (g/10 min. °C.) | >100 | 1.0 | 8.6 | 2.9 | 25.3 |
| Appearance | ◯ | × | × | △ | ◯ |
| Particle size (μm) | >1.00 | 0.02 | 0.06 | 0.08 | 0.05 |
| Flexural modulus (kg/cm²) | 13,000 | 27,000 | 19,300 | 8,500 | 30,000 |
| Dispersion of modified olefin | × | — | × | — | — |

Appearance: ◯: Good, △: Fair, ×: Bad
Dispersion of modified olefin: ⊚: Excellent, ◯: Good, ×: Bad. —: Not measured.
*¹Only barium stearate was added.
*²Only ethylenebisstearylamide was added.
*³Barium stearate and ethylenebisstearylamide were not added.

BRIEF DESCRIPTION OF THE DRAWINGS

In the accompanying drawings.

Figure 1:
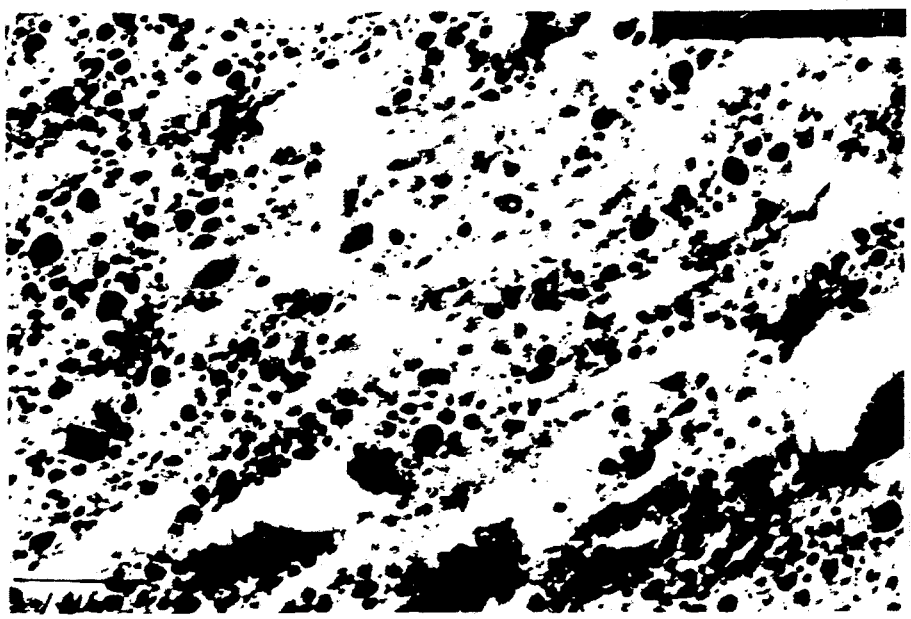
FIGS. 1, 2 and 3 are electron microscopic photographs showing the dispersed states of the maleimide copolymer particles in the resin compositions obtained in Example 2 and Comparative Examples 1 and 3, respectively. In these photographs, the length of 15 mm corresponds to 1 μm.
Figure 2:
Figure 3:
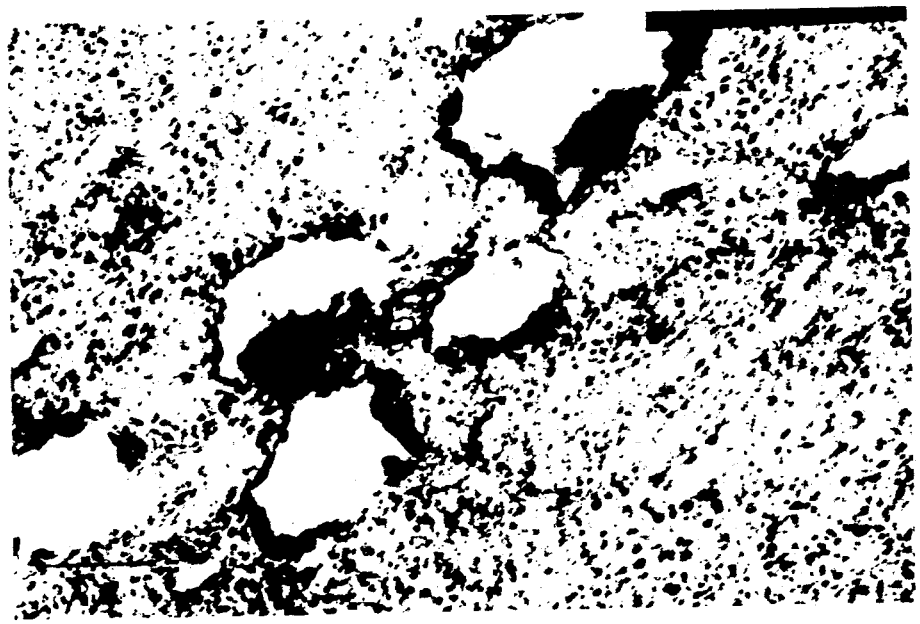

We claim:

1. A thermoplastic resin composition comprising:
(A) from 10 to 50% by weight of a maleimide copolymer of from 30 to 70 mol% of an aromatic vinyl monomer, from 30 to 50 mol% of a maleimide monomer, from 3 to 20 mol% of an unsaturated dicarboxylic anhydride monomer and from 0 to 50 mol% of other copolymerizable monomer;
(B) from 40 to 80% by weight of a polyamide; and
(C) from 3 to 40% by weight of a polyolefin polymer of an olefin monomer, selected from the group consisting of ethylene, propylene, 1-butene, isobutylene, 2-butene, cyclobutene, 3-methyl-1-butene, 4-methyl-1-butene, 4-methyl-1-pentene, cyclopentene, 1-hexene, cyclohexene, 1-octene, 1-decene and 1-dodecene and mixtures thereof, or a copolymer of said monomer and a non-conjugated diene monomer selected from 4-ethylidenenorbornane and dicyclopentadiene or with an acrylate monomer, modified by from 0.1 to 10% by weight of an unsaturated dicarboxylic anhydride monomer or an unsaturated carboxylic acid monomer and mixtures thereof,
wherein said maleimide copolymer is in the form of dispersed particles of from 0.01 to 1.0 μm.

2. The thermoplastic resin composition according to claim 1, wherein the modified polyolefin polymer is in the form of particles having a non-specific shape and is substantially uniformly dispersed.

3. The thermoplastic resin composition according to claim 1, which further contains a metal salt of an organic acid or a fatty acid amide and mixtures thereof.

4. The thermoplastic resin composition according to claim 1, wherein said other copolymerizable monomer is an acrylate monomer.

5. The thermoplastic resin composition according to claim 1, wherein the aromatic vinyl monomer is a member selected from the group consisting of styrene, α-methylstyrene, vinyl toluene, t-butylstyrene and a mixture thereof; the maleimide monomer is a member selected from the group consisting of maleimide, N-methyl maleimide, N-ethyl maleimide, N-propyl maleimide, N-hexyl maleimide, N-cyclohexyl maleimide, N-phenyl maleimide, N-tolyl maleimide and a mixture thereof; the unsaturated dicarboxylic acid anhydride monomer is a member selected from the group consisting of maleic anhydride, methylmaleic anhydride, 1,2-dimethylmaleic anhydride, ethylmaleic anhydride, phenylmaleic anhydride and a mixture thereof; and said other copolymerizable monomer is a member selected from the group consisting of methyl (meth)acrylate, ethyl (meth)acrylate, butyl (meth)acrylate, hexyl (meth)acrylate, cyclohexyl (meth)acrylate, decyl (meth)acrylate, octadecyl (meth)acrylate, hydroxyethyl (meth)acrylate, methoxyethyl (meth)acrylate, glycidyl (meth)acrylate and a mixture thereof.

6. The thermoplastic resin composition according to claim 1, wherein the polyamide is a member selected from the group consisting of 6-nylon, 6,6-nylon, 6,9-nylon, 6,10-nylon, 6,12-nylon, 4,6-nylon, 11-nylon, 12-nylon, poly(hexamethylene terephthalamide), poly(hexamethylene isophthalamide), poly(m-xylyleneadipamide) and a mixture thereof.

7. The thermoplastic resin composition according to claim 1, wherein the modified polyolefin polymer is a polymer or copolymer of an olefin monomer selected from the group consisting of ethylene, propylene, 1-butene, isobutylene, 2-butene, cyclobutene, 3-methyl-1- butene, 4-methyl-1-butene, 4-methyl-1-pentene, cyclopentene, 1-hexene, cyclohexene, 1-octene, 1-decene, 1-dodecene and a mixture thereof, modified by from 0.1 to 10% by weight of a monomer selected from the group consisting of maleic anhydride, methylmaleic anhydride, 1,2-dimethylmaleic anhydride, ethylmaleic anhydride, phenylmaleic anhydride, acrylic acid, methacrylic acid and a mixture thereof.

8. A molded product prepared from a thermoplastic resin composition as defined in claim 1.

* * * * *